July 2, 1968 R. B. PHELPS ETAL 3,390,577
MONITORING SYSTEM FOR FLUID FLOW IN DROP FORM
Filed Sept. 24, 1965
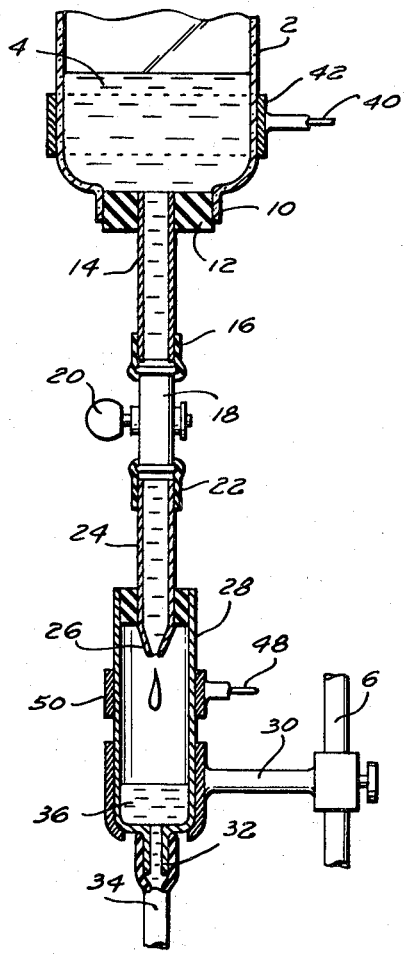
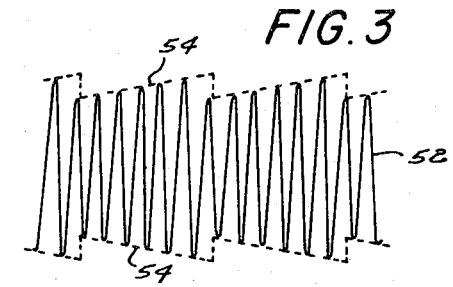
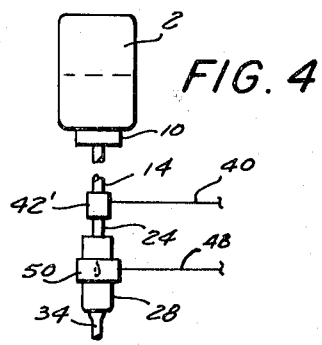
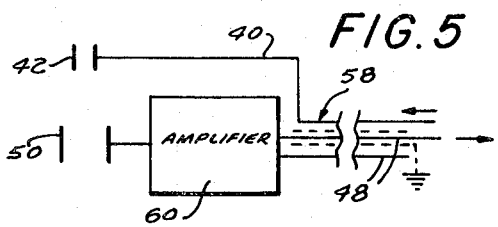
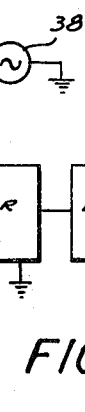
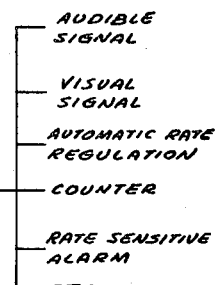
INVENTORS
RICHARD B. PHELPS
VINCENT P. FRIBERG
BY
ATTORNEY

United States Patent Office

3,390,577
Patented July 2, 1968

3,390,577
MONITORING SYSTEM FOR FLUID FLOW
IN DROP FORM
Richard B. Phelps, New Milford, and Vincent P. Friberg,
Leonia, N.J., assignors to General Instrument Corporation, Newark, N.J., a corporation of New Jersey
Filed Sept. 24, 1965, Ser. No. 489,844
18 Claims. (Cl. 73—194)

ABSTRACT OF THE DISCLOSURE

A drop monitoring system suitable for monitoring the flow of fluid drops in the course of medical infusion and transfusion procedures in which the embryonic drops as they form and before they become discrete drops function to couple an electrical signal source to an electrical detecting means, the coupling varying as the embryonic drop takes shape and then falls in the form of a discrete drop, thereby to produce a characteristic electrical signal each time that a drop is formed.

---

The present invention relates to a system for monitoring the flow of fluid drops, and is particularly well adapted for use in the monitoring of infusion procedures.

A need exists for a reliable and foolproof system for measuring the rate of drop formation and/or flow in various systems. Particularly is this true in medical procedures such as intravenous infusion, where the rate at which treatment fluids are introduced into the patient's bloodstream, or otherwise introduced into his body, is exceedingly important. Ordinarily a supply of treatment fluid (e.g. blood, glucose solution, or the like) is used and means are provided which permit that fluid to drip at a controlled rate into a closed container from which the fluid is transferred directly to the body of the patient. A valve, adjustable clamp or other device is provided by means of which the rate of fluid flow to the patient may be adjusted. It is important to the proper carrying out of the medical procedure, and it is often vital to the very life of the patient, that the treatment fluid continue to be provided at the desired rate, that is to say, that the drop formation proceed always at the rate to which it is adjusted. However, there are many factors which tend to cause that rate to change. For example, the rate of drop formation may be to some extent dependent upon the head of treatment fluid disposed above the drop-forming orifice, and depletion of the supply of that fluid will therefore cause diminution in the rate of drop formation. Vibration or shock may cause the drop-rate-controlling clamp or valve to shift its setting. An obstruction may find its way into the passage in advance of the drop-forming orifice. For these and other reasons, it is essential to the proper administration of the curative technique that the existence of a change of rate of drop formation be readily known to those in charge, and that proper ameliorative measures be taken immediately.

This usually requires personal monitoring of each infusion or similar operation by a nurse or other qualified person. Since infusion procedures often extend over a long period of time, this represents a very considerable problem to hospital administration, particularly in view of the present shortage of available nurses. Moreover, because of the repetitive and monotonous task involved, which tends to lull an observer into a state of semi-hypnosis, the reliability even of skilled personal supervision leaves much to be desired.

Means have been proposed in the past to provide for more or less automatic monitoring of such procedures, thereby to eliminate the necessity for individual supervision thereof. For example, it has been proposed to determine the rate of drop formation by acoustically sensing the noise or vibrations produced by the drops as they fall from a drop-forming orifice into a pool of liquid therebelow, or by photoelectrically detecting the drops as they fall along a predetermined path. These types of detection, however, have been subject to the very grave disadvantage that spurious signals are produced by happenings other than drop fall, these prior art systems being incapable of distinguishing between such spurious signals and the signals actually associated with drop fall. As a result the reliability and accuracy of the monitoring carried out by such systems is inadequate and, it will be borne in mind, reliability and accuracy are often literally of vital importance.

It is the prime object of the present invention to devise a drop flow monitoring system which operates on a different principle from the systems of the prior art, and which as a result of that different principle of operation is insensitive to spurious signals and hence has an exceptionally high degree of accuracy and reliability. It is a further prime object of the present invention to devise such a system which is simple and inexpensive, and which may readily be adapted for use with medical infusion equipment which is presently available.

In accordance with the above, an electrical signal of predetermined character is electrically coupled to the body of fluid from which the drops are to be formed. These drops are formed at a predetermined station, such as at the tip of an orifice, from which station they fall or otherwise flow. A detecting system is electrically connected to an electrode which is positioned adjacent to but spaced from the drop-forming station, thereby to couple the detecting system to the drop-forming station and/or the liquid which is there present. As a drop forms the coupling to the detecting means will vary in one sense, and when the drop falls that coupling will vary abruptly in the opposite sense. This variation in coupling will impress a modulation upon the original signal, which modulation will be detected by the detecting means, and the frequency of that modulation will represent the frequency of drop formation. Many types of electrical circuitry capable of carrying out such detection and of producing any appropriate or desired type of indication are well known. The type of modulation produced by the formation and falling of drops is not, so far as is known, simulated by any other events likely to occur at or in the vicinity of the monitoring system, and as a result the detected signal variations constitute a highly accurate and reliable indication of the rate of drop formation.

To the accomplishment of the above, and to such other objects as may hereinafter appear, the present invention relates to a drop monitoring system as defined in the appended claims, and as described in this specification, taken together with the accompanying drawings, in which:

FIG. 1 is a cross sectional view of a typical medical infusion system with which the monitoring system of the present invention has been associated;

FIG. 2 is a block diagram of the infusion and monitoring system of the present invention;

FIG. 3 is a schematic graphical representation of the type of electrical signal involved;

FIG. 4 is an idealized diagrammatic view, on a reduced scale, showing a different way of mounting the electrodes of the monitoring system; and FIG. 5 is an idealized diagrammatic view of electrical connections which can be employed where the monitoring takes place at a location remote from the place where the generation and detection of signals occurs.

FIG. 1 discloses a typical apparatus which is employed medically for carrying out an infusion procedure, such as the gradual supplying of a glucose solution intravenously.

It comprises a jar or other container 2 in which the treatment fluid 4, such as a glucose solution, is received. The container 2 is adapted to be mounted in an elevated inverted position on a supporting standard 6 by means of clamp 8. It is provided at its mouth 10 with a stopper 12 through which a tube 14 extends. Connected to the lower end of the tube 14 by rubber coupling 16 is a valve 18 which, through rotation of the knob 20, can cause the rate of flow of fluid therethrough to be varied. The lower end of the valve 18 is connected by rubber coupling 22 to tube 24 having a narrowed tip 26 which defines a drop-forming station. The tip 26 is received within a second container 28 supported by clamp 30 on standard 6. The lower end of the container 28 is open, at 32, and is adapted to be connected by tube 34 to a catheter or the like inserted into the vein of a patient. In operation the valve 18 is adjusted so that drops form at the tip 26 of the tube 24 at a predetermined rate, those drops, as they are formed, falling from the tube tip 26 through the body of the container 28 into a pool 36 of such treatment material which forms in the bottom of the container 28 and which extends in continuous liquid form through the tube 34 and the catheter thereto connected into the vein of the patient.

In accordance with the present invention, detection of the rate of formation of drops at the tube tip 26 is accomplished as follows: A source of electrical signals 38 is provided. The nature of these signals may vary widely; an alternating signal having a frequency of 30 kilocycles per second has been found to be quite satisfactory, but alternating signals having other frequencies, and signals other than alternating signals, could also be employed. The means for forming such signals are well known, and constitute no part of the present invention. The signals from the source 38 are coupled to the treatment liquid 4 and/or to the drop-forming station defined by the tube tip 26 in any appropriate manner. As disclosed in FIGS. 1 and 2 this coupling is accomplished by means of a conductive electrode 42, connected to source 38 by lead 40, which extends closely around the outside of the container 2 and which is therefore capacitively coupled to the liquid 4 within the container 2. In the embodiment of FIG. 4 the lead 40 is connected to an electrode 42' which surrounds the tube 24, the signal source 38 thus being capacitively coupled to that portion of the treatment liquid supply 4 which is located within the tube 24 immediately adjacent the drop-forming station 26. Capacitive coupling of this type is not essential to the operation of the present invention. Any type of operative connection between the signal source 38 and the liquid 4 will serve. However, capacitive coupling is preferred because it avoids possible contamination of the liquid 4 which might be attendant, for example, upon the insertion of an electrode thereinto, and capacitive coupling is further desired because it permits the use of existing monitoring equipment, such as the containers 2 and tubes 24, to which the electrodes 42 or 42' may readily be applied.

A detector 44 of any appropirate electrical design is electrically connected, preferably with an interposed amplifier 46, to the drop-forming station 26 in such a fashion that the signals detected thereby will be constituted by the signals produced by the means 38 modified, however, in accordance with the status of the liquid drop being formed at the station 26. To this end the detector 44 (with the interposed amplifier 46) is connected by lead 48 to an electrode 50 mounted on the container 28 close to but spaced from the drop-forming station 26.

The electrode 50 is thus capacitively coupled to the drop-forming station 26, and in particular to the liquid 4 at that station. Specifically, electrodes 42 and 50, containers 2 and 28 and fluid 4 define two capacitors connected in series between source 38 and detector 44. Electrode 42 defines one plate of the first capacitor, electrode 50 defines one plate of the second capacitor, fluid defines a plate common to both capacitors, and is sufficiently electrically conductive to have that effect, container 2 defines a dielectric for the first capacitor and container 28 defines a dielectric for the second capacitor. As a drop forms the spacing between that liquid and the electrode 50 will decrease, thereby increasing the capacitive coupling. That coupling will increase gradually as the drop enlarges, and hence the amplitude of the signal detected by the detector 44 will increase. When the drop falls from the station 26 the spacing between the electrode 50 and the liquid 4 will abruptly increase, the capacitive coupling therebetween will abruptly decrease, and hence the amplitude of the detected signal will abruptly decrease. Consequently, as indicated in an idealized form in FIG. 3, the signal detected by the detector 44 will be constituted by a signal alternating at the frequency produced by the signal source 38, as represented by the solid line 52, but with an amplitude modulated in what may be described as a sawtooth manner, as indicated by the broken lines 54 represent the envelope of the solid line signal in FIG. 3.

In order to ensure that the detector 44 will be subjected only to the signals produced by the signal source 38, the amplifier 46 may be tuned to pass only signals of that type.

The detector 44 produces a series of sawtooth pulses at the frequency of drop formation (hereinafter termed the "audio frequency" to differentiate it from the higher or "radio frequency" of the signal source 38). This audio frequency signal is amplified at 56 and then may be used for any desired purpose. For example, each drop, as indicated by an audio frequency pulse, could be caused to produce an audible signal at some remote monitoring station. Alternatively or in addition, a visual signal, such as a flashing light, could be similarly actuated. The number of drops could be counted electronically, so as to give an immediate indication of the amount of fluid administered. Suitable rate-sensitive electronic circuits could actuate an alarm if the signal rate were either above or below predetermined values. The rate sensitive circuits could also actuate appropriate driving mechanism so as to automatically control the setting of the valve 18. Many other uses of the system will become apparent, and it will further be realized that the precise nature of the electrical circuitry involved may vary widely, all as is well known to those versed in the art, depending upon the type of signal employed and the type of external indication desired.

When the circuitry (the signal source 38, the detector 44, and the associated amplifiers 46 and 56) is located remote from the place where the infusion operation takes place, as may well be the case in a hospital where infusion is carried out in individual patients' rooms and all of the monitoring takes place in a separate room, the monitoring apparatus may be connected to the electrodes 52 and 50 by an elongated cable generally designated 58 (see FIG. 5). When this is done it is advantageous to mount an amplifier 60, preferably of the transistor type, at the end of the cable adjacent to the electrode 50, thereby to increase the level of the signal coupled thereto, and thus overcome the attenuating effects of low cable impedance.

The electrodes 42 and 50 may be individually applied to the receptacles 2 and 28 and be held in place by being clamped thereon. Alternatively they may be supported on a standard (either the standard 6 or a separate standard). In the embodiment of FIG. 4 the electrodes 42' and 50 are close enough to one another as to be capable of being mounted on the same clamping structure. Other mechanical arrangements will suggest themselves, the flexibility and adaptability of the devices of the present invention constituting one of their more important advantages.

It is not essential that the valve 18 be located in flow-advance of the drop-forming orifice 26. It may, and in many instances is, located directly in the line or tube 34. When thus positioned any change in the rate of flow of fluid therethrough will be reflected in a variation in the level of the pool 36, which will in turn affect the pressure within the second container 28, thereby affecting the rate of drop formation, and it is to the rate of drop formation and nothing else that the present system is sensitive.

Because of the specific nature of the signal to which the detector 44 is sensitive, and the precise relationship between that signal and the formation of drops at the station 26, it will be seen that the system of the present invention gives a reliable and accurate indication of drop rate, and is not subject to spurious signals. The apparatus involved is simple and reliable, may readily be attached to existing infusion equipment and may equally as readily be built into infusion equipment, all at nominal cost.

While but a limited number of embodiments of the present invention have been here disclosed, it will be apparent that many variations may be made therein, all within the scope of the instant invention as defined in the following claims.

We claim:

1. A drop monitoring system comprising a source of liquid, means connected in fluid flow relation to said liquid source for forming liquid drops and causing said drops to pass therefrom, a source of electrical signals, first means for electrically coupling said signal source to said drop-forming means, signal detecting means, and second means spaced from said drop-forming means and electrically coupling said detecting means thereto, said detecting means being sensitive to changes in said signals attendant upon formation of said drops with consequent variation of the coupling effect of said second coupling means.

2. The system of claim 1, in which said second coupling means is capacitive in nature.

3. In the system of claim 1, a chamber into which said drop-forming means extends and through a portion of which the drops formed thereby are adapted to pass, said second coupling means comprising an electrode mounted on said chamber portion.

4. In the system of claim 1, a chamber into which said drop-forming means extends and through a portion of which the drops formed thereby are adapted to pass, said second coupling means comprising an electrode mounted on said chamber portion and capacitively coupled to said drop-forming means.

5. The system of claim 4, in which said detecting means is located remote from said second coupling means and is connected thereto by an elongated cable, and a signal amplifier connected between said second coupling means and said cable.

6. A drop monitoring system comprising a source of liquid, means connected in fluid flow relation to said liquid source for forming liquid drops and causing said drops to pass therefrom, a source of alternating electrical signals, first means for electrically coupling said signal source to said drop-forming means, signal detecting means, and second means spaced from said drop-forming means and electrically coupling said detecting means thereto, said detecting means being sensitive to changes in said signals attendant upon formation of said drops with consequent variation of the coupling effect of said second coupling means.

7. The system of claim 6, in which said second coupling means is capacitive in nature.

8. The system of claim 6, in which said second coupling means is capacitive in nature and said detecting means is sensitive to modulation of said signals.

9. The system of claim 6, in which said second coupling means is capacitive in nature and said detecting means is sensitive to amplitude modulation of said signals.

10. In the system of claim 6, a chamber into which said drop-forming means extends and through a portion of which the drops formed thereby are adapted to pass, said second coupling means comprising an electrode mounted on said chamber portion.

11. In the system of claim 6, a chamber into which said drop-forming means extends and through a portion of which the drops formed thereby are adapted to pass, said second coupling means comprising an electrode mounted on said chamber portion and capacitively coupled to said drop-forming means.

12. In the system of claim 6, a chamber into which said drop-forming means extends and through a portion of which the drops formed thereby are adapted to pass, said second coupling means comprising an electrode mounted on said chamber portion, said detecting means being sensitive to modulation of said signals.

13. In the system of claim 6, a chamber into which said drop-forming means extends and through a portion of which the drops formed thereby are adapted to pass, said second coupling means comprising an electrode mounted on said chamber portion, said detecting means being sensitive to amplitude modulation of said signals.

14. In the system of claim 6, a chamber into which said drop-forming means extends and through a portion of which the drops formed thereby are adapted to pass, said second coupling means comprising an electrode mounted on said chamber portion and capacitively coupled to said drop-forming means, said detecting means being sensitive to modulation of said signals.

15. In the system of claim 6, a chamber into which said drop-forming means extends and through a portion of which the drops formed thereby are adapted to pass, said second coupling means comprising an electrode mounted on said chamber portion and capacitively coupled to said drop-forming means, said detecting means being sensitive to amplitude modulation of said signals.

16. The system of claim 15, in which said detecting means is located remote from said second coupling means and is connected thereto by an elongated cable, and a signal amplifier connected between said second coupling means and said cable.

17. The system of claim 1, in which said detecting means is located remote from said second coupling means and is connected thereto by an elongated cable, and a signal amplifier connected between said second coupling means and said cable.

18. The system of claim 6, in which said detecting means is located remote from said second coupling means and is connected thereto by an elongated cable, and a signal amplifier connected between said second coupling means and said cable.

References Cited

UNITED STATES PATENTS

| | | | |
|---|---|---|---|
| 2,746,295 | 5/1956 | Lubkin | 73—398 |
| 2,807,012 | 9/1957 | Schwarz. | |
| 2,880,764 | 4/1959 | Pelavin | 73—194 XR |
| 3,123,541 | 3/1964 | Donnell. | |

RICHARD C. QUEISSER, *Primary Examiner.*

C. A. RUEHL, *Examiner.*